United States Patent
Kawaguchi et al.

(10) Patent No.: US 6,934,891 B2
(45) Date of Patent: Aug. 23, 2005

(54) STORAGE SYSTEM HAVING TRACE INFORMATION FETCHING STRUCTURE AND METHOD OF FETCHING THE SAME

(75) Inventors: Masahiro Kawaguchi, Odawara (JP); Shizuo Yokohata, Ninomiya (JP); Shinichi Nakayama, Chigasaki (JP); Youichi Goto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 519 days.

(21) Appl. No.: 09/907,618

(22) Filed: Jul. 19, 2001

(65) Prior Publication Data

US 2002/0124140 A1 Sep. 5, 2002

(30) Foreign Application Priority Data

Mar. 2, 2001 (JP) ........................................ 2001-057623

(51) Int. Cl.[7] ................................................ G06F 11/00
(52) U.S. Cl. ........................................................ 714/48
(58) Field of Search ...................... 714/45, 48; 717/127, 717/128; 711/118

(56) References Cited

U.S. PATENT DOCUMENTS

| | | | | |
|---|---|---|---|---|
| 6,314,529 B1 | * | 11/2001 | Rana | 714/29 |
| 6,438,715 B1 | * | 8/2002 | Assouad | 714/45 |
| 6,530,076 B1 | * | 3/2003 | Ryan et al. | 717/128 |
| 6,587,957 B1 | * | 7/2003 | Arsenault et al. | 713/500 |
| 6,615,371 B2 | * | 9/2003 | McCullough et al. | 714/45 |
| 6,718,294 B1 | * | 4/2004 | Bortfeld | 703/20 |
| 2002/0120815 A1 | * | 8/2002 | Zahavi et al. | 711/118 |

FOREIGN PATENT DOCUMENTS

| JP | 11-212821 | 8/1999 |
|---|---|---|
| JP | 2000-187621 | 7/2000 |

* cited by examiner

Primary Examiner—Robert Beausoliel
Assistant Examiner—Marc M. Duncan
(74) Attorney, Agent, or Firm—Mattingly, Stanger, Malur & Brundidge, P.C.

(57) ABSTRACT

A storage system includes a storage controller connected to higher-level devices and a plurality of storages connected to the storage controller for storing data from the higher-level devices. The storage controller includes a channel controller for establishing interface for the higher-level devices, the channel controller including trace information representing details of the interface, and storages for storing the trace information from the channel controller in a format which can be accessed by the higher-level devices. In this configuration, when the channel controller receives a trace information fetching indication from one of the higher-level devices, the channel controller transfers trace information to a cache memory and the storages or to the cache memory or the storages.

8 Claims, 3 Drawing Sheets

FIG.3

| ITEM | TYPE | |
|---|---|---|
| TRACE INDICATION MODE | START | INTERRUPTION |
| TRACE INFORMATION FETCHING DESTINATION | CACHE | DEV#N |
| TRACE CONDITION | SPECIFIED DEV# | SPECIFIED HOST # |
| TERMINATION DETERMINATION | TIME | EVENT OCCURRENCE |
| FETCHING INFORMATION | ALL | COMMAND, STATUS |
| TRACE INFORMATION COLLECTION | PC | HOST |

STORAGE SYSTEM HAVING TRACE INFORMATION FETCHING STRUCTURE AND METHOD OF FETCHING THE SAME

BACKGROUND OF THE INVENTION

1. Field of the Invention

The present invention relates to a storage, a storage system having a data fetching method, particularly a trace function, to trace a command sequence in an input/output (I/O) interface, and a method of fetching trace information thereof.

2. Description of the Related Art

In the storage system, information obtained by tracing a command sequence in an I/O interface is useful for failure analysis and performance analysis. In the failure analysis, the data is used as follows. A command sequence before and after occurrence of a failure is used to detect a process to the failure and direct causes of the failure. Additionally, the data is used in the performance analysis as follows. A pattern of the command sequence issuance is determined to detect processing in the storage system which exerts influence on the performance.

In a storage system connected to a main frame computer, trace information of such a command sequence is in general fetched by, for example, a utility "generalized trace facility (GTF)" of IBM. Moreover, there exists a method to fetch the trace information using a device called "SCSI analyzer". The SCSI analyzer can be connected to a storage system to fetch trace information.

However, GTF is a function installed only in a main frame system, and an equivalent trace function is not satisfactory supported in an open system at present. Therefore, there possibly occurs a case in which a failure taking place in an open system cannot be easily analyzed. Moreover, when the SCSI analyzer is used, it is necessary to once stop a path on the host side connected to the pertinent SCSI path. This possibly exerts adverse influence on business of the customer, and hence it is difficult to fetch trace information at an appropriate time.

To solve the problem of the SCSI analyzer, for example, JP-A-2000-187621 describes a technique in which information on a bus of the SCSI and information on a processor bus are traced and the trace is stopped at occurrence of an abnormality. However, if a trace area reserved is insufficient, new trace information overlaps old trace information or the trace is stopped when the trace area becomes full of information. Consequently, expected information cannot be fetched depending on cases.

To solve the problem of the trace area, JP-A-11-212821 describes a technique in which the trace information is fetched in a trace buffer with a limited capacity by using a data compression/expansion function of a magnetic tape controller. However, also in this technique, since the trace information is fetched in the buffer with a physically limited capacity, even when trace information is fetched for a long period of time for performance analysis, there occurs a case in which information is insufficient. This disadvantageously leads to a problem that the performance analysis cannot be conducted.

Furthermore, in a case of a storage system including a plurality of processors to process data I/O operations between hosts and storages, there occurs a problem that even trace information of the respective processors is fetched, a relationship of a sequence of trace information cannot be easily recognized.

In short, the problems will be listed in order as follows.
(1) Establishing a unit to fetch long-term trace information.
(2) Establishing a unit to fetch trace information having a consistent relationship during execution of concurrent processing by a plurality of processors.
(3) Establishing a trace information fetching unit not exerting adverse influence on business of customers.

The inventor considers that a fundamental cause of three problems above is that all trace information in the storage system is treated as data dedicated to the storage system. Therefore, the inventor recognizes that a dedicated buffer and a dedicated fetching tool are necessary in the storage system and hence cause various restrictions.

SUMMARY OF THE INVENTION

It is therefore an object of the present invention to aim at treating the trace information as part of user data and at resultantly removing the restrictions such as a restriction of the storage capacity of the trace information to be stored.

Specifically, this is implemented as follows. Trace information is not stored in a memory of the processor which processes data input/output operations between a host and a storage, but is temporarily stored as part of user data in a buffer in the controller or in a cache memory. The data is then sequentially collected onto a control medium of the higher-level device, a personal computer (PC), or the like.

To expand the trace information capacity, it is possible to store the trace information as user data in a storage not used or used as a work area. This increases the amount of trace information.

To achieve the object above according to the present invention, there is provided a storage system including a storage control unit connected to higher-level devices and a plurality of storages connected to the storage control unit for storing data from the higher-level devices. The storage control unit includes a channel controller for establishing interface for the higher-level devices, the channel controller including trace information representing details of the interface; and storage units for storing the trace information from the channel controller in a format which can be accessed by the higher-level devices.

BRIEF DESCRIPTION OF THE DRAWINGS

The objects, features and advantages of the present invention will become more apparent from the following detailed description of the embodiments of the invention when taken in conjunction with the accompanying drawings in which:

FIG. 3 is a table showing examples of parameters indicated from the service processor.

DESCRIPTION OF THE EMBODIMENTS

Next, the present invention will be described by referring to the accompanying drawings.

Figure 1:
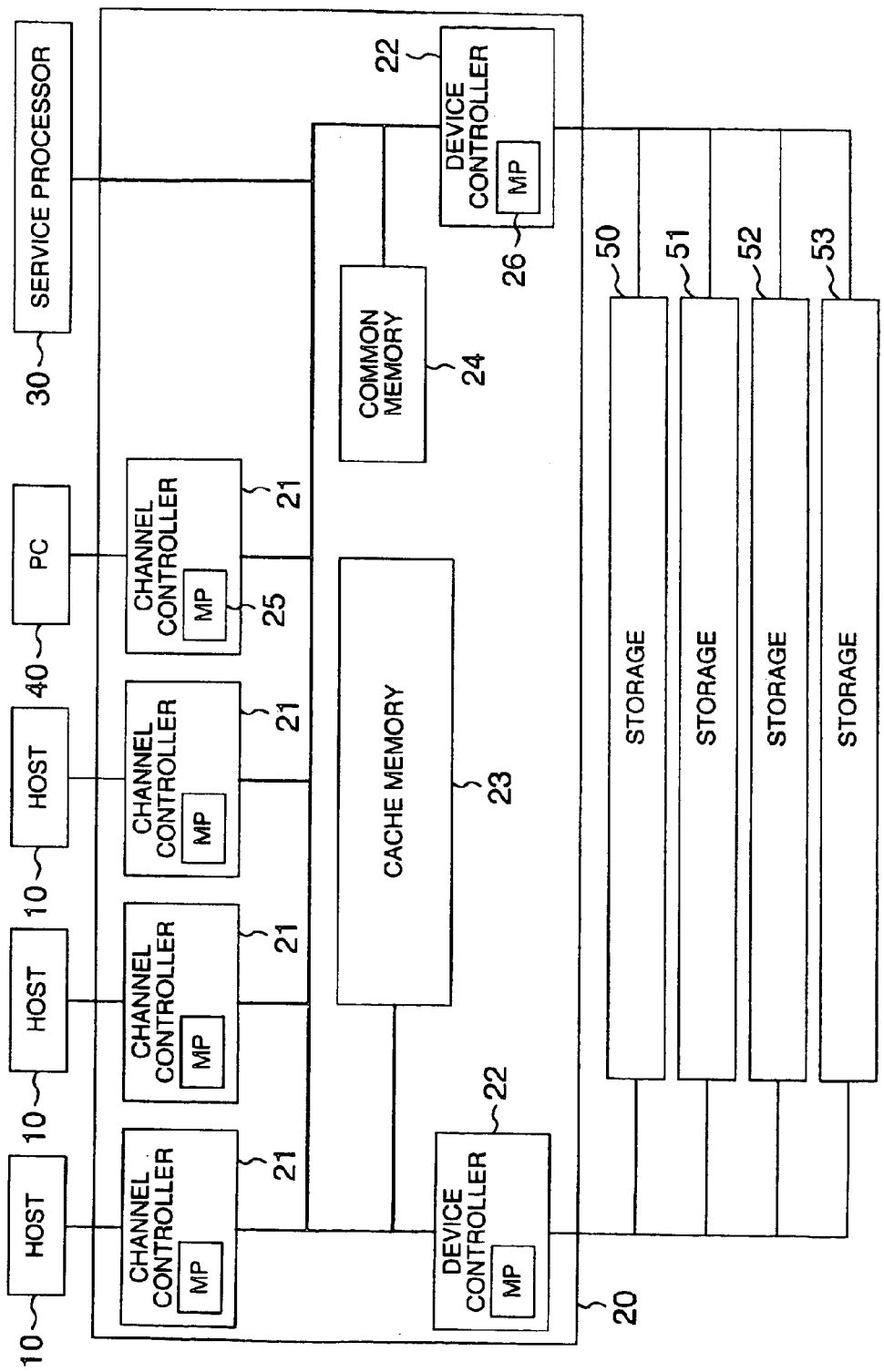
FIG. 1 is a block diagram showing an embodiment of the present invention.

FIG. 1 shows a storage system in an embodiment of the present invention in a hardware configuration diagram. The storage system includes a controller 20 and a plurality of storages 50 to 53. The storage system shown in FIG. 1 further includes a service processor 30 to maintain and to control the controller 20 and the storages 50 to 53. Each constituent component of the storage system will be described below.

The controller 20 includes channel controllers 21, device controllers 22, a cache memory 23, and a common memory 24. The channel controller 21 is connected to a host 10 or a personal computer (PC) 40 to receive data input/output (I/O) requests from the host 10, to write data from the host 10 in a cache memory 23, and to transfer data from the cache memory 23 to the host 10. The device controller 22 writes data from the cache memory 23 in the respective storages 50, 51, 52, and 53 and transfers data from the respective storages 50 to 53 to the cache memory 23. The common memory 24 keeps information (to be referred to as configuration information herebelow) necessary for the controller 20 to control the entire storage system. Each of the channel controllers 21 includes a microprocessor (MP) 25 to conduct the control operation above and each of the device controllers 22 includes a microprocessor (MP) 26 to conduct the control operation above. Each of the MPs is also connected to the common memory 24 such that the MP conducts I/O control from the host and I/O control with the storages 50 to 53 by referring to the configuration information. The service processor 30 is a maintenance terminal including a graphic user interface (GUI). The service processor 30 is connected to each of the MPs 25 and 26 and has a function in which the service processor 30 issues a maintenance indication to each MP 25 or 26 in response to a maintenance operation, detects information regarding failures taking place in the storage system, and notifies the failures to a maintenance center.

The channel controllers 21 and the device controllers 22 access the cache memory 23 and the common memory 24 via control lines indicated by bold lines. The service processor 30 sends indications for the definition, modification, and the like of the configuration to the controller 20. Like the host 10, the PC 40 is connected to the channel controller 21 to collect the traced information.

Description will now be given of the trace processing. The trace processing is executed by the MPs 25 and 26. In the trace processing, the MP 25 or 26 having received a trace information fetching indication from the service processor 30, the host 10, or the PC 40 reads trace information thereof or the pertinent MP 25 or 26 identifies trace information and transfers the trace information to the specified service processor 30, the host 10, or the PC 40. Furthermore, an indication of the trace processing can be issued from the service processor 30, the host 10, or the PC 40. When the trace processing indication is received by, for example, the MP 25, the MP 25 once writes, while executing the trace processing, trace information in the cache memory 23 in a data format equal to that of user data. The trace information written in the cache memory 23 is stored by the MP 26 of the device controller 22 in the storage 50, 51, 52, or 53. Although a storage destination is written in a particular volume of either one of the storages 50 to 53, it is also possible to specify that the information is only temporarily stored in the cache memory 23. This is used by the PC 40 to collect and to refer to the trace information temporarily stored in the cache memory 23. The storage destination specification is defined as a parameter of the trace processing start indication. When the trace information is temporarily stored in the cache memory 23, an area is reserved as a trace information dedicated area in the cache memory 23 in the data format equal to that of the user data. This prevents the device controllers 22 to store data in the storages 50, 51, 52, and 53.

When the trace start indication is issued, it is also possible to indicate a trace termination condition. For example, a fetching time is specified such that after a lapse of the fetching time, the trace processing is terminated. Or, a trace information fetching amount is indicated such that when an amount of fetched trace information exceeds the specified fetching amount, the trace processing is terminated. The trace termination condition is checked during the trace information fetching processing, and the trace fetching processing is terminated when the termination is determined according to the condition. Moreover, it is possible to terminate the trace information fetching processing by issuing a trace termination indication.

Figure 2:
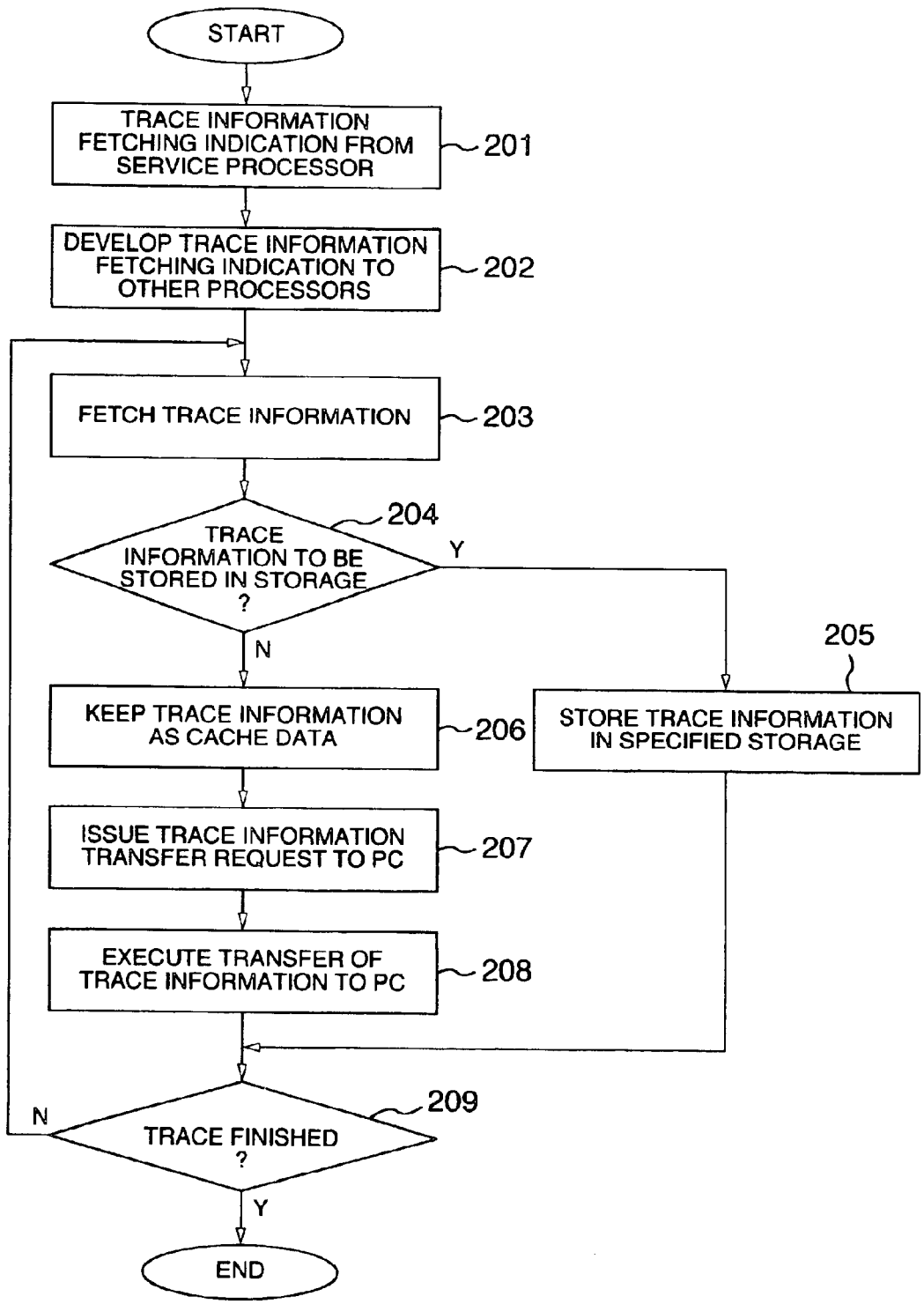
FIG. 2 is a flowchart showing an embodiment of the present invention.

FIG. 2 is a flowchart showing processing of the I/O trace information fetching method. Description will be given of an example in which the service processor 30 indicates the MP 25 to fetch trace information and to store the information in the cache memory 23 or the storage 50, 51, 52, or 53. First, in step 201, the service processor issues a fetching indication to the MP 25. In this operation, a trace information storage destination, namely, the cache memory 23 or the storage 50, 51, 52, or 53 is also indicated together with a parameter, which will be described later. Having received the trace information fetching indication, the MP 25 creates, in step 202, information in the common memory 24 to notify the reception of the fetching indication to other MPs 25. At occurrence of a trace event, the MP 25 having received the indication in step 203 identifies trace information. The MP 25 further determines in step 204, according to the indication of the trace information storage destination, that the trace information is temporarily stored in the cache memory 23 or is stored as data of the specified storage 50, 51, 52, or 53. First, description will be given of a case in which the trace information is stored in either one of the storages 50 to 53. The MP 25 writes the trace information as data of the specified storage in the cache memory 23. In this case, the trace information is in a format equal to that of the user data. The trace information written in the cache memory 23 is written by the device controller 22 in the pertinent storage and the trace information of the cache memory 23 is discarded (step 205), and the processing proceeds to step 209. In step 209, the MP 25 in the trace information readout operation checks to determine the termination of the trace processing. If the trace processing termination condition is not satisfied, the processing returns to step 203. Thereafter, the trace information is stored in the specified storage until the trace processing termination condition is satisfied.

Next, description will be given of a case in which the trace information is temporarily stored in the cache memory 23. In step 206, the MP 25 having received the fetching indication saves the trace information in the cache memory 23, specifically, in the trace information dedicated area. In steps 207 and 208, the PC 40 connected to the channel controller 21 collects the trace information. In step 207, the MP 25 executes a transfer request, to the PC 40 connected thereto, for the trace information temporarily stored in the cache memory 23. In response to the transfer request, the PC 40 executes a read request. The MP 25 transfers the pertinent trace information from the cache memory 23 to the PC 40. After the transfer is completed, the pertinent trace information of the cache memory 23 is discarded (step 208). Next, the processing proceeds to step 209 to determine the termination of the trace. If the trace termination condition is not satisfied, the processing returns to step 203. Thereafter, the trace information is stored in the storage until the trace termination condition is satisfied.

In the description, one of the MPs 25 receives a trace information fetching indication from the service processor 30. In a case in which one of the MPs 26 receives a trace information fetching indication from the service processor 30, the MP 26 identifies, like the MP 25, trace information in the MP 26 and temporarily stores the trace information in the cache memory 23 or in one of the storages specified by the device controller 22. As in the storing operation described above, the trace information is stored in these storages in a data format equal to that of the user data.

In conjunction with FIG. 2, although description has been given of a case in which the trace information fetching is indicated by the service processor 30, the trace information fetching indication can also be issued by the host 10 and the PC 40.

FIG. 3 is an example of parameters of trace modes for an trace information fetching operation indicated by the service processor 30. In this example, the parameters specify a trace indication mode, a trace information fetching destination, a trace condition, termination determination, and fetching information. FIG. 3 shows two items specifiable by each of the parameters. One of the items is "start" or "interruption" for the trace indication mode. "Start" means a trace information fetching start indication. "Interruption" means a trace information fetching interruption indication. As the trace information fetching destination, "cache" or particular "DEV#" is specified. "Cache" is specified when it is desired that information is temporarily stored in the cache memory 23. "DEV#" is specified when it is desired that information is stored in a particular device. "DEV#" means a device number of a storage destination device. As the trace condition, there exist two types, namely, "specified DEV#" and "specified host #". "Specified DEV#" means that only history of I/O processing of the specified device is stored as trace information. "Specified host #" means that processing history of only I/O from the specified host is stored as trace information. As the termination determination, there exist two types, namely, "time" and "event occurrence". "Time" is a time at which trace information is fetched. This means that the trace information fetching is terminated when the specified time lapses after the trace information fetching is started. "Event occurrence" means that the trace information fetching is terminated (or interrupted) when "interruption" is indicated. As the fetching information, "all" or "command, status" is specified. When "all" is specified, the trace processing is executed such that all information which can be fetched is stored. When "command,status" is specified, the trace processing is executed such that only data of the executed command or only data of a particular state is stored. Since FIG. 3 shows only one example, the parameters may include the contents other than those of FIG. 3.

Next, description will be given of processing to collect trace information. Although many methods can be considered to collect the trace information, four methods will be described in this paragraph. In a first method, the MP 25 executes a trace information transfer request to the PC 40 such that trace information is fetched by the PC 40 from the cache memory 23. This is as described using the flowchart of FIG. 2. In a second method, the service processor 30 issues an indication to the MP 26 of the device controller 22, and in response to a transfer request issued by the pertinent MP 26, trace information is read from the associated storage and is transferred to the service processor 30. In a third method, the host 10 issues a trace information fetching indication to the MP 25 of the channel controller 21. That is, in response to the indication from the host 10, processing is executed as follows. In response to a transfer request issued by the MP 25, trace information is read from the cache memory 23 and is transferred to the host 10. The indication from the host 10 is issued using, for example, a mode select command of the SCSI command. This command has a field of "vendor unique page", and the vendor can freely define the field for use. The host 10 specifies in this page parameters shown in FIG. 3 and then issues the mode select command. The MP 25 of the channel controller 21 of the controller 20 refers to "command mode select" and the vendor unique page to start the trace processing. Moreover, in this command, when the trace information collection is defined in the trace indication mode, the MP 25 having received the command issues a transfer request. Therefore, trace information is transferred to the host 10. In a fourth method, the host 10 conducts a trace information reading operation for the storage as the trace information storage destination. That is, in response to a transfer request issued by the MP 26, trace information is transferred to the host 10. Therefore, the trace information stored in the storage has a data format equal to that of the user data.

Additionally, when the host can directly fetch the trace information from the cache memory 23 or the storages 50 to 53, it is possible that the host 10 edits the trace information and issues again an I/O request according to the trace information to conduct a reproduction test for the failure analysis. Analysis of an I/O issuance pattern of the storage as a trace target can also be easily conducted by the host 10, and hence the trace information can be efficiently utilized.

When the trace information identified by the MP 25 or 26 is stored in the cache memory 23, it is also possible to convert the format of information into the data format of the ordinary I/O data. Although details of the data format is not particularly described in this paragraph, the data format need only match the data format used to store I/O data received from the higher-level device in the storages 50 to 53 or the data format used to store data in the cache memory 23. Resultantly, the trace information stored in the cache memory 23 and the storages 50 to 53 can be treated as user data, and hence it is not required for the cache memory 23, the storages 50 to 53, and the MPs 25 and 26 which control these storing components to conduct particular recognition for the trace information.

Moreover, since trace information is stored as user data, it is practical if there exists a method to assign an identifier thereto to acquire the information. To implement the method, it is not changed that when the trace information is stored, the trace information is stored in the data format of user data. However, it is only necessary to write, as header information, an identifier indicating that the data is trace information, day and time when the data is fetched, an identifier to discriminate the trace information, and the like. The identifier for the discrimination may be, for example, a sequential number which is incrementally increased each time trace information is fetched or an item obtained by combining the sequential number with the day and time when the information is fetched. As a result, the side to obtain the trace information can determine whether or not the obtained data includes header information of the trace information.

However, in this method, the side to obtain the information must make a search through the written trace information, and it is to be noted that a position at which the information is written must be beforehand memorized. For this purpose, there can be considered a method in which a table to store fetching positions is reserved in the common memory 24 on the side of the controller 20. When information is obtained, the information is collated with the common memory 24 to determine a first point and a last point of the trace information.

For the trace fetching method, description has been mainly given of a case in which the method is applied to one of the processors 25 and 26. It is also necessary that the trace information fetching operation is conducted for a plurality of processors at the same time. If processing timing between the MPs can be comprehensively analyzed, the trace information is more useful for the detection of causes at occurrence of a failure and for performance analysis. In this case, it is only necessary for the service processor 30, the host 10, and the PC 40 to respectively issue the trace information fetching indications to the MPs. The respective MPs can independently execute the trace processing. However, for the trace information fetching start indication, an issuing method thereof must be appropriately devised for the following reason. If the start indication is issued to each MP, there occurs a state in which some MPs has started the trace information identifying operation and some MPs has not started the trace information identifying operation. This leads to a problem that in an initial stage of the trace information fetching operation, trace information regarding communication between the MPs and trace information regarding processing timing therebetween cannot be fetched.

As a method to solve this problem, there is used a method in which an indication to read trace information of which ones of the MPs is issued only to a particular MP and then the MP having received the indication starts issuing the trace processing indication to other specified MPs. As above, without manually issuing the indication to each MP, the particular MP automatically issues the indication to other specified MPs, and hence the trace information fetching operation can be almost simultaneously started. By collectively storing trace information respectively identified by the MPs, it is possible to fetch consistent trace information.

Since the MPs identify trace information, it is possible to directly process an ordinary I/O from the host 10 as in the SCSI analyzer. Therefore, it is not required that the processing on the side of the host 10 is stopped by the trace information fetching operation.

As above, by treating trace information as part of user data, it is possible to fetch a large amount of trace information. Moreover, since the trace information is temporarily accumulated in a cache memory which can be accessed by a plurality of MPs, it is possible to keep consistency of the fetched trace information. Furthermore, since the MPs identify the trace information, it is possible to remove any direct influence to business of the customer which takes place when the SCSI analyzer is used.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A storage system having a trace information fetching function including storage control means connected to higher-level devices; and a plurality of storages connected to said storage control means for storing data from said higher-level devices, wherein said storage control means comprises:

a channel controller for establishing interface for said higher-level devices, said channel controller including trace information representing details of the interface; and storage means for storing the trace information from said channel controller in a format to be accessed by said higher-level devices, wherein said storage control means further comprises:

a plurality of channel controllers respectively corresponding to said higher-level devices; and a common memory for storing, when at least one of said channel controllers receives information of a trace information fetching indication from one of said higher-level devices, the indication information to notify the indication information to other channel controllers.

2. A storage system according to claim 1, wherein said higher-level device issues a trace information fetching indication to said channel controllers.

3. A storage system according to claim 1, wherein said higher-level device issues a trace information fetching indication to at least one of said device controllers.

4. A method of fetching trace information for use with a system comprising a plurality of higher-level devices, storage means, and storage control means disposed between the higher-level devices and the storage means, the storage control means including a channel controller for establishing interface for the higher-level devices and the storage means, the trace information representing details of said interface, comprising the steps of:

(a) indicating fetching of trace information from the higher-level devices to the channel controller;

(b) storing, by the channel controller having received the fetching indication, the indicated information in a common memory;

(c) identifying, by the channel controller, trace information thereof, determining according to the indicated information one of the storage means to store trace information, and storing the trace information in the storage means;

(d) issuing a request from the channel controller to the higher-level devices, the request indicating acquisition of the trace information stored in the storage means; and (e) transferring the trace information stored in the storage means from the channel controller to the higher-level devices, wherein:

said step (c) includes the steps of:

identifying, by the channel controller, trace information thereof;

determining according to the indicated information that the storage means is the cache memory and temporarily storing the trace information in the cache memory;

storing thereafter the trace information stored in the cache memory in the storages; and said step (d) includes the step of issuing a request from the channel controller to the higher-level devices, the request indicating acquisition of the trace information stored in the storages.

5. A storage system having a trace information fetching function comprising:

a plurality of storages storing data from a higher-level device;

a plurality of channel controllers for controlling the data transfer from said higher-level device to a cache memory; and a plurality of device controllers for controlling the data transfer from said cache memory to said storages, wherein each channel controller has a microprocessor and when one microprocessor receives a command which indicates the fetching of trace information, said microprocessor issues the command which indicates the fetching of trace information to other microprocessors to start said fetching simultaneously.

6. A storage system according to claim 5, wherein said higher-level device issues said command which indicates the fetching of trace information to said channel controllers.

7. A storage system according to claim 5, wherein said higher-level device issues said command which indicates the fetching of trace information to said channel controllers.

8. A method for performing trace information fetching comprising the steps of:

storing data from a higher-level device into a plurality of storages;

controlling the data transfer from said higher-level device to a cache memory using a plurality of device controllers; and controlling the data transfer from said cache memory to said storages using a plurality of device controllers, wherein each channel controller has a microprocessor and when one microprocessor receives the command which indicates the fetching of trace information, said microprocessor issues the command which indicates the fetching of trace information to other microprocessors to start said fetching simultaneously.

* * * * *